H. L. LOWE.
INSULATOR AND CUT-OUT SWITCH.
APPLICATION FILED DEC. 22, 1916.
1,240,067.
Patented Sept. 11, 1917.
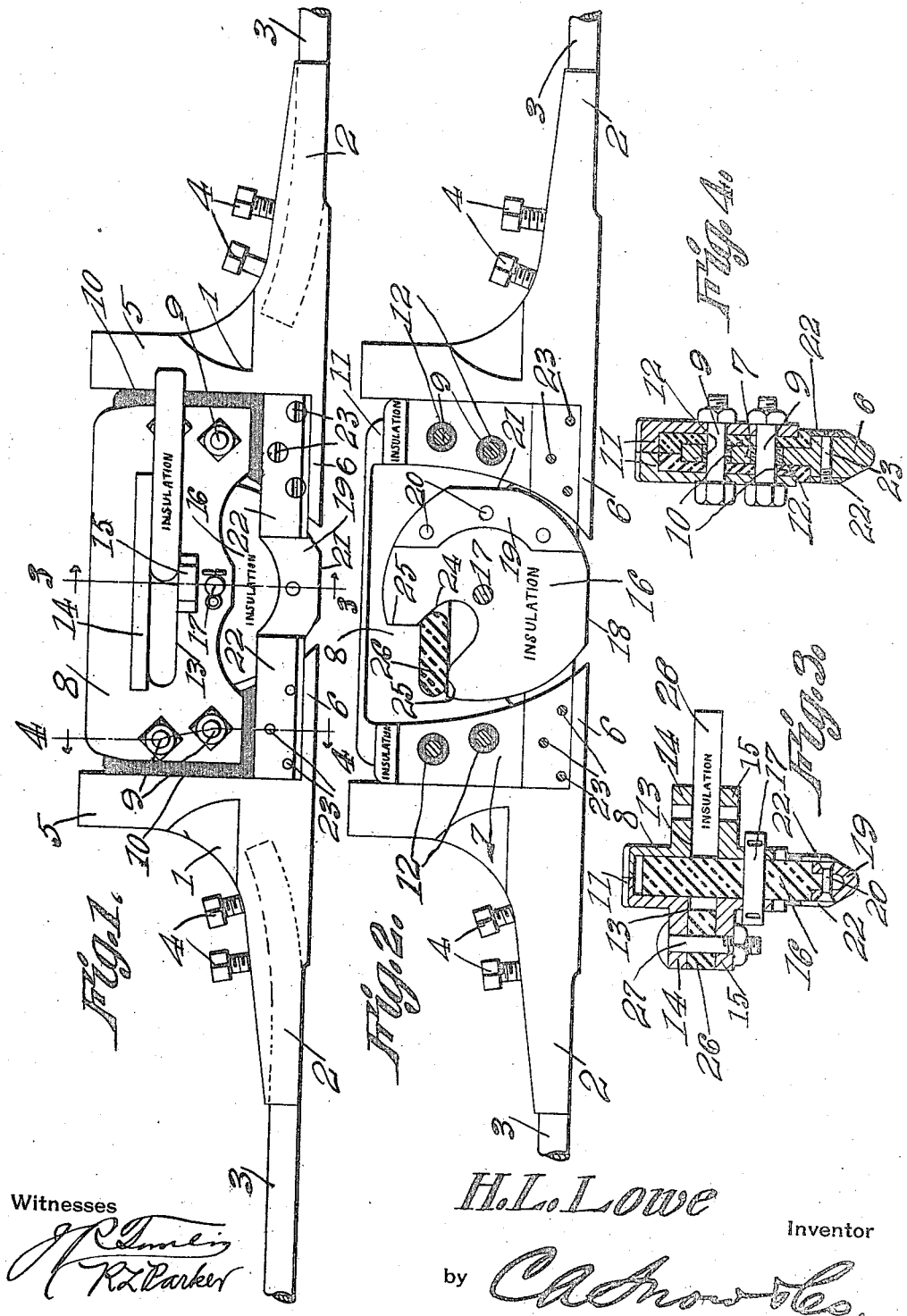
Witnesses
H. L. Lowe
Inventor
by
Attorneys

UNITED STATES PATENT OFFICE.

HARRY L. LOWE, OF CLINTON, INDIANA, ASSIGNOR TO CLINTON SWITCH COMPANY, OF CLINTON, INDIANA.

INSULATOR AND CUT-OUT SWITCH.

1,240,067.      Specification of Letters Patent.      Patented Sept. 11, 1917.

Application filed December 22, 1916. Serial No. 138,407.

*To all whom it may concern:*

Be it known that I, HARRY L. LOWE, a citizen of the United States, residing at Clinton, in the county of Vermilion and State of Indiana, have invented a new and useful Insulator and Cut-Out Switch, of which the following is a specification.

The present invention appertains to insulators and cut out switches for trolley wires, and it is the object of the invention to provide a device of that character of novel and improved construction, to enhance the utility and efficiency thereof.

Another object of the invention is the provision in a device of the character described, of novel means for actuating and holding the switch member in either open or closed position.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the device showing the switch member in closed position.

Fig. 2 is a similar view showing the switch member in open position, portions being removed and broken away.

Figs. 3 and 4 are cross sections taken on the respective section lines 3—3 and 4—4 of Fig. 1.

In carrying out the invention, there is provided a pair of metallic members or sections 1 which are conductors of electrical energy, and which are provided with lower socketed portions 2 projecting away from one another for receiving the terminals of the trolley wire sections 3 which are clamped within the portions 2 by means of set screws 4 or otherwise. The members 1 are provided at the basal ends of the portions 2 with upstanding hanger portions 5 which are attachable to the suspension means or overhead supporting structure for suspending the device and trolley wire in any suitable manner. The members 1 have tongues 6 at their lower portions projecting toward one another in alinement with the portions 2 and under which the trolley wheel is adapted to run in contact therewith. The members 1 have webs 7 between the portions 5 and tongues 6, which are connected for rigidly uniting the members 1, by means of vertical side plates 8 bridging the space between the tongues 6 and located between the portions 5 above said tongues, bolts 9 or other clamping elements extending transversely through the end portions of the plates 8 and the webs 7 to clamp the webs between the plates, whereby to provide a rigid structure. Insulation 10 is disposed between the plates 8 and webs 7 and also extends between the ends of the plates 8 and portions 5 and between the lower edges of said plates and the tongues 6, thereby insulating the plates 8 from the members 1, so that said members are insulated from one another. The upper edges of the plates 8 have inturned flanges or lips 11 contacting with each other, to close the upper portion of the space between the plates 8, and the insulation 10 also extends between the upper ends of the webs 7 and the flanges 11. Insulating rings 12 are preferably disposed within the openings of the webs 7 around the bolts 9 to complete the insulation between the plates 8 and members 1.

The plates 8 are provided with longitudinal opposed slots 13 between the webs 7, and with outstanding apertured ears 14 and 15 at opposite sides above and below said slots.

The switch member comprises a disk 16 of fiber or other insulating material disposed between the plates 8 in the median plane of members 1 and also located between the webs 7, said disk 16 being mounted for oscillation upon a transverse pivot pin 17 engaged through the plates 8 and disk 16 between the ends of said plates below the slots 13. The disk 16 has a straight edge 18 which is brought between and in alinement with the lower edges of the tongues 6 when the disk or switch member 16 is turned to open position, and a metallic bridging member 19 of U-shaped cross section straddles and is fitted upon the marginal portion of the disk 16 at substantially right angles with the edge 18. The member 19 is secured upon the disk by means of rivets 20 or other securing elements extending through the member 19 and disk. The member 19 has a straight edge 21 at right angles with the straight edge 18 and adapted to be brought between and in alinement with the lower edges of the tongues 6 when the disk 16 is turned to closed position. Contact strips 22, arranged in pairs, are secured to opposite sides of the tongues 6 by means of screws 23, or the like, and project toward one another so that their inner or adjacent ends overlap the faces of the disk 16. Thus, when the disk 16 is turned to closed position, the bridging member 19 is brought between the two pairs of contact strips 22, so that the protruding ends of said strips overlap the member 19, whereby said member bridges the gap between the contact strips and said contact strips being secured to the members 1 will thereby electrically connect said members and the trolley wire sections 3 in this position of the disk 16. When the disk 16 is turned to bring the edge 18 lowermost, the member 19 is removed from one pair of contact strips 22, thereby disconnecting the strips 22 and members 1 electrically, for opening the circuit at this point, thereby providing the cut out switch.

In order to oscillate the disk 16, said disk is provided with a radial open slot 24 at that point diametrically opposite the point intermediate the edges 18 and 21. The disk 16 has diverging shoulders 25 at the open end or mouth of the slot 24 for the purpose which will presently appear. An operating lever or arm 26 extends through the slots 13 and 24, and has one end pivotally engaging a pivot bolt or element 27 extending through the apertures of the ears 14 and 15 at one side of the device. Said lever can be pivoted to either pair of ears so as to project toward the desired side. The lever 26 can be operated in any suitable manner, and if desired, an operating mechanism can be connected thereto for operating the lever from a distant point. When the lever 26 is swung in one direction, said lever in working in the slot 24 will turn the disk 16 in the corresponding direction to either open or closed position, and when the disk 16 reaches its proper position, the lever 26 will start to move out of the slot 24 and will move across the respective shoulder 25, which will lock the disk 16 in position, so that the engagement of the trolley wheels therewith is not apt to turn said disk. The disk cannot turn in one direction due to the abutment of the respective shoulder 25 against the lower surface of the lever 26, and the disk 16 cannot turn in the other direction due to the contact of the opposite edge of the slot 24 with the upper portion of the lever 26. This is true in either position of the disk 16. In other words, the operating device for the disk 16 is irreversible, in that the disk 16 can be readily actuated by operating the lever 26, but the parts cannot be operated by applying force to the disk 16 without swinging the lever 26.

Having thus described the invention, what is claimed as new is:—

1. A device of the character described embodying a pair of spaced members, a pair of plates extending between said members, means securing said plates and members together, insulation between said plates and members to insulate them from one another, a disk of insulating material pivoted between said plates to rotate about a transverse axis in the plane of said members and having a bridging member at one point, and contact strips carried by the first mentioned members below said plates and projecting toward one another, said contact strips overlapping the faces of said disk to be bridged by the bridging member below said plates when the disk is turned to one position.

2. A device of the character described embodying a pair of spaced members, a pair of plates between said members, means securing said plates and members together, insulation between said plates and members to insulate them from one another, a disk of insulating material pivoted between said plates and having a bridging member at one point, contact strips carried by the first mentioned members and projecting toward one another, said contact strips overlapping said disk to be bridged by the bridging member when the disk is turned to one position, one of said plates having a slot, a lever pivotally connected with the other plate and extending through said slot, said disk having a slot in which said lever works for oscillating the disk when the lever is swung.

3. A device of the character described embodying a pair of plates, one having a slot, a disk of insulating material pivoted between said plates and having a bridging member, and a lever pivoted to the other plate and extending through said slot, said disk having a slot in which said lever works for oscillating the disk when the lever is swung.

4. A device of the character described having a pair of members spaced apart, a switch member mounted for turning movement about a transverse axis between said members, and having a bridging member to be moved into and out of bridging position between said pair of members, and a transversely extending lever pivotally mounted between said pair of members, the switch member having a slot through which the lever projects.

5. A device of the character described having a pair of members spaced apart and provided with contact portions, a connection between said members, a switch member pivoted to said connection to rotate about a transverse axis and having a bridging member adapted to be moved into and out of bridging position between said contact portions, and a lever pivoted to said connection and extending to one side, the switch member having a radial open slot through which said lever projects and from which the lever is partially movable when swung in either direction.

In testimony that I claim the foregoing as my own, I have hereto affixed my signature in the presence of two witnesses.

HARRY L. LOWE.

Witnesses:
  MARK W. LYDAY,
  W. S. PINSON.

Copies of this patent may be obtained for five cents each, by addressing the "Commissioner of Patents, Washington, D. C."